(12) United States Patent
Thomsen et al.

(10) Patent No.: US 8,843,708 B2
(45) Date of Patent: Sep. 23, 2014

(54) CONTROL BLOCK LINKAGE FOR DATABASE CONVERTER HANDLING

(75) Inventors: Dirk Thomsen, Heidelberg (DE); Ivan Schreter, Malsch (DE)

(73) Assignee: SAP AG, Walldorf (DE)

( * ) Notice: Subject to any disclaimer, the term of this patent is extended or adjusted under 35 U.S.C. 154(b) by 635 days.

(21) Appl. No.: 13/169,855

(22) Filed: Jun. 27, 2011

(65) Prior Publication Data
US 2012/0331230 A1 Dec. 27, 2012

(51) Int. Cl.
*G06F 12/08* (2006.01)
*G06F 17/30* (2006.01)

(52) U.S. Cl.
CPC .............................. *G06F 17/30327* (2013.01)
USPC ............................ 711/126; 711/118; 707/705

(58) Field of Classification Search
None
See application file for complete search history.

(56) References Cited

U.S. PATENT DOCUMENTS

| | | | |
|---|---|---|---|
| 6,973,650 B1 * | 12/2005 | Parkes et al. ................ | 718/100 |
| 8,200,633 B2 * | 6/2012 | Bendakovsky et al. ....... | 707/640 |
| 8,626,717 B2 * | 1/2014 | Bendakovsky et al. ....... | 707/660 |
| 2008/0126739 A1 | 5/2008 | Archer et al. | |
| 2011/0035359 A1 * | 2/2011 | Bendakovsky et al. ....... | 707/640 |
| 2012/0221523 A1 * | 8/2012 | Bendakovsky et al. ....... | 707/640 |

FOREIGN PATENT DOCUMENTS

WO 2008/047246 A2 4/2008

OTHER PUBLICATIONS

"Communication: Extended European Search Report", dated Jan. 31, 2013, for European Patent Application No. 12004743.6-1225, 6pgs.

* cited by examiner

*Primary Examiner* — Kevin Verbrugge
(74) *Attorney, Agent, or Firm* — Buckley, Maschoff & Talwalkar LLC

(57) ABSTRACT

A system to load a plurality of converter pages of a datastore into a database cache, the plurality of converter pages comprising a plurality of converter inner pages, and a plurality of converter leaf pages, to allocate a control block in the database cache for each of the plurality of converter inner pages, the control block of a converter inner page comprising a pointer to a control block of a parent converter inner page and a pointer to a control block of each child converter page of the converter inner page, and to allocate a control block in the database cache for each of the plurality of converter leaf pages, the control block of a converter leaf page comprising a pointer to a control block of a parent converter inner page.

12 Claims, 8 Drawing Sheets

US 8,843,708 B2

CONTROL BLOCK LINKAGE FOR DATABASE CONVERTER HANDLING

FIELD

Some embodiments relate to database systems. In particular, some embodiments concern control blocks for cached pages of a database system.

BACKGROUND

A conventional database system uses a datastore to persistently store data pages, and a cache to provide fast access to the data pages. For example, in response to a request to access a data page, the data page is loaded from the datastore into the cache, and may thereafter be accessed from and/or modified within the cache.

The datastore may include a tree of converter pages. Converter pages at the lowest level of the tree map logical page numbers of data pages to locations of the datastore at which the data pages are stored. The tree of converter pages is loaded into the cache upon initialization of the database system, and the cached converter pages are used to determine the location of a particular page within the datastore in response to a request to access the particular page.

At specified times (e.g., when the cache reaches a particular percentage of full capacity, when a savepoint is initiated, etc.), modified data pages from the cache are written back to the datastore. A "shadow paging" system may be employed, in which the original unmodified data page remains designated as a "last known good" page in the datastore and the modified data page is written to a new location in the datastore. The converter pages are therefore modified within the cache once a modified data page is saved to a new location of the datastore. The modified converter pages are written to the datastore at the end of a savepoint, after all modified data pages are written, and are written to locations which are different from the locations of the last versions of the converter pages.

In order to determine the location of a particular page in the datastore, the cached tree of converter pages is traversed from its root level to a corresponding converter page located at the lowest level of the tree. For example, a converter page at the root level may identify one or more converter pages located at a next level of the tree. A hashmap, which was created when the converter pages were loaded into the cache, is consulted to determine the cache addresses of the identified next-level converter pages in the tree. The process repeats to traverse the levels of the tree until the address of a lowest-level converter page corresponding to the desired logical page number is determined.

As described above, a modified data page is eventually written from the cache to the datastore. After writing such a page, its associated lowest-level converter page is modified in order to point to the location at which the modified data page is written, and all ancestor pages of the modified converter page are also modified. Identification of each of these to-be-modified converter pages also requires a distinct hash map transaction as described above.

DETAILED DESCRIPTION

Figure 1:
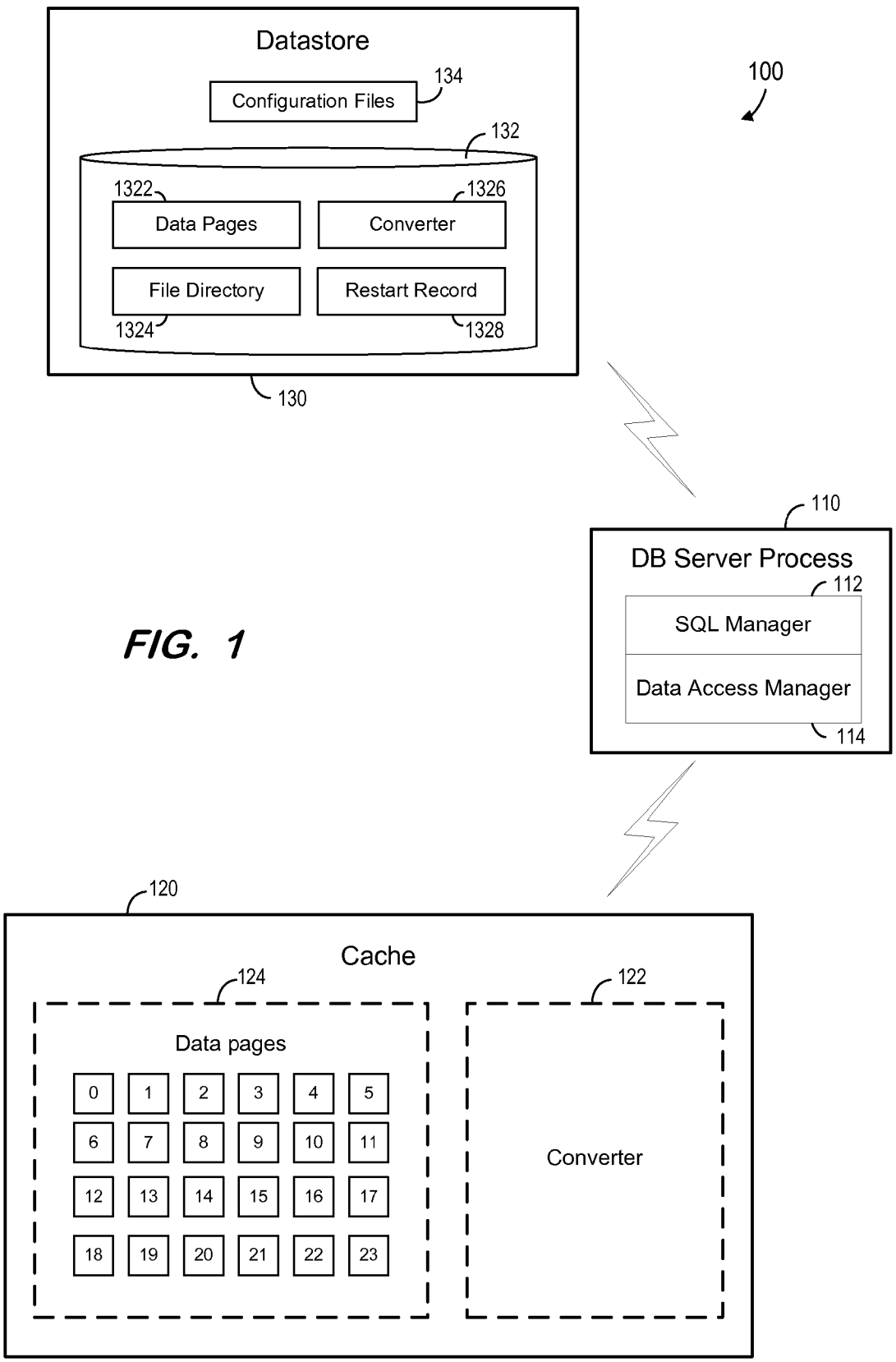
FIG. 1 is a block diagram of a database according to some embodiments.

FIG. 1 is a block diagram of database system 100 according to some embodiments. Database system 100 includes database server process 110, cache 120 and datastore 130.

Database system 100 may communicate with one or more database applications (not shown) over one or more interfaces (e.g., a Structured Query Language (SQL)-based interface). The database applications may provide, for example, business reporting, inventory control, online shopping, and/or any other suitable functions. The database applications may, in turn, support client applications that may be executed by client devices. Such a client application may simply comprise a Web browser to access and display reports generated by a database application.

The data of database system 100 may be received from disparate hardware and software systems, some of which are not interoperational with one another. The systems may comprise a back-end data environment employed in a business or industrial context. The data may be pushed to database system 100 and/or provided in response to queries received therefrom.

Although embodiments are described with respect to database system 100, which is a "single node" database system, embodiments may also be implemented within one or more nodes of a distributed database, each of which comprises an executing process, a cache and a datastore. The data stored in the datastores of each node, taken together, represent the full database, and the database server processes of each node operate to transparently provide the data of the full database to the aforementioned database applications. Database system 100 may also or alternatively support multi-tenancy by providing multiple logical database systems which are programmatically isolated from one another.

Database system 100 and each element thereof may also include other unshown elements that may be used during operation thereof, such as any suitable program code, scripts, or other functional data that is executable to interface with other elements, other applications, other data files, operating system files, and device drivers. These elements are known to those in the art, and are therefore not described in detail herein.

Database server process 110 may comprise any system for managing a database system that is or becomes known. Generally, database server process 110 may receive requests for data (e.g., SQL requests from a database application), may retrieve the requested data from datastore 130 or from cache 120, and may return the requested data to the requestor. In some embodiments, database server process 110 includes SQL manager 112 to process received SQL statements and data access manager 114 to manage access to stored data. Database server process 110 may also perform start-up, logging, recovery, management, optimization, monitoring, indexing, integrity checks and other database-related tasks.

Database server process 110 may comprise and/or may be implemented by computer-executable program code. For example, database system 100 may comprise one or more hardware devices, including at least one processor to execute program code so as to cause the one or more hardware devices to provide database server process 110.

For purposes of the foregoing description, it will be assumed that datastore 130 comprises only data volume 132. Datastore 130 may comprise one or more data volumes in some embodiments, with each of the one or more data volumes comprising one or more disparate physical systems for storing data. These physical systems may comprise a portion of a physical hard disk, an entire physical hard disk, a storage system composed of several physical hard disks, and/or Random Access Memory ("RAM"). In regards to the latter alternative, database system 100 may comprise an "in-memory" database, in which both the data of datastore 130 and cache 120 are stored in volatile (e.g., non-disk-based) memory (e.g., RAM). In some embodiments, the stored data may comprise one or more of conventional tabular data, row-based data, columnar data, and object data.

Generally, a data volume is subdivided into storage areas known as blocks, and data is stored in the data volume in data pages 1322, each of which has the same size as a block. Accordingly, a particular data page 1322 of datastore 130 may be accessed by referencing the data volume and block address associated with that data page. Data pages 1322 may include application data consisting of tabular data, row-based data, columnar data, object data and associated index entries. In a case that datastore 130 includes more than one data volume, data pages 1322 may be spread across one or more of its data volumes.

Data volume 132 includes file directory 1324 and converter 1326. If datastore 130 includes more than one data volume, file directory 1324 and converter 1326 may also be spread across one or more of the data volumes. When a new data page is created, the data page is assigned a unique logical page number. Converter 1326 maps this logical page number to the data volume and block address at which the data page is stored. File directory 1324 maps a file identifier to a logical page number of a corresponding file root page, and the aforementioned database catalog maps each file identifier to associated metadata, including a name of a database object associated with the file identifier. Accordingly, the information of the database catalog and file directory 1324 may be used to determine a logical page number from a name of a database object, for example. Restart record 1328, which may also be stored in any data volume of datastore 130, is identifies a location of a root page of converter 1326.

The foregoing process also applies to "in-memory" implementations. However, an identifier of a data volume in which a page is stored might not be utilized in such implementations, as the in-memory datastore might simply comprise addressable memory locations which are not divided into logical data volumes.

Datastore 130 may also include configuration files 134 defining properties of database system 110 (e.g., a size and physical location of each data volume, a maximum number of data volumes in datastore 130, etc.). Moreover, datastore 130 typically includes system files, database parameters, paths, user information and any other suitable information. Datastore 130 may also store a database catalog including metadata describing the database objects that are stored therein.

Cache 120 may be implemented in RAM, and stores various elements of datastore 130 during execution of database system 100. These elements may include recently-accessed ones of data pages 1322, pages of converter 1326, and/or a log queue. As shown, cache 120 includes converter 122 and data pages 124. Converter 122 and data pages 124 are illustrated separately herein for the sake of clarity. However, according to some embodiments, converter 122 and data pages 124 might not comprise separate, contiguous memory addresses of cache 120. For example, pages of converter 122 may be interspersed among data pages 124 throughout cache 120.

The pages of converter 1326 are created in cache 120 as converter 122 in order to provide fast access to data pages 1322. In this regard, a database transaction may require access to a database object stored in data pages 1322. A file identifier corresponding to the database object is determined based on the database catalog, and a logical page number of a root page of the database object is determined from the file identifier using file directory 1324. Next, converter 122 within cache 120 is traversed to determine a block address of data volume 132 at which the root page is stored, based on the logical page number.

Figure 2:
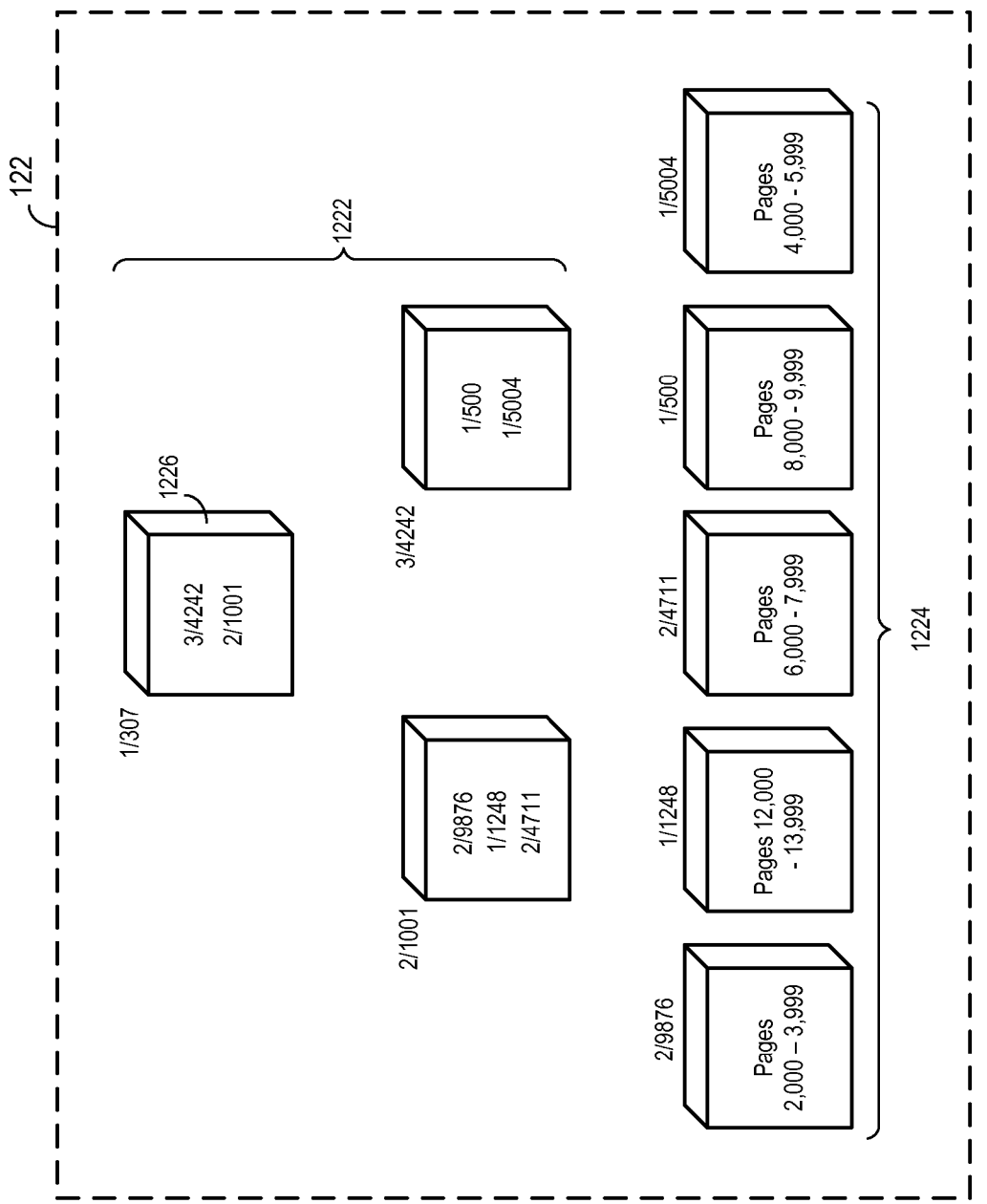
FIG. 2 illustrates a converter stored in a datastore according to some embodiments.

FIG. 2 illustrates converter 122 of cache 120 according to some embodiments, which includes converter inner pages 1222 and converter leaf pages 1224. Locations at which converter inner pages 1222 and converter leaf pages 1224 are stored are identified using the convention "volume number/block address", and FIG. 2 thereby indicates that is datastore 130 consists of at least three data volumes. As mentioned above, embodiments are not limited to databases having more than one data volume.

Each inner page 1222 specifies block addresses of one or more child converter pages, which may comprise one or more inner pages 1222 or one or more leaf pages 1224. Inner pages 1222 may be used to locate a leaf page 1224 corresponding to a particular logical page number. A converter leaf page 1224 provides the storage locations of data pages corresponding to each logical page number associated with the leaf page 1224. These storage locations are where the "last known good" versions of these data pages are stored in datastore 130.

Figure 3:
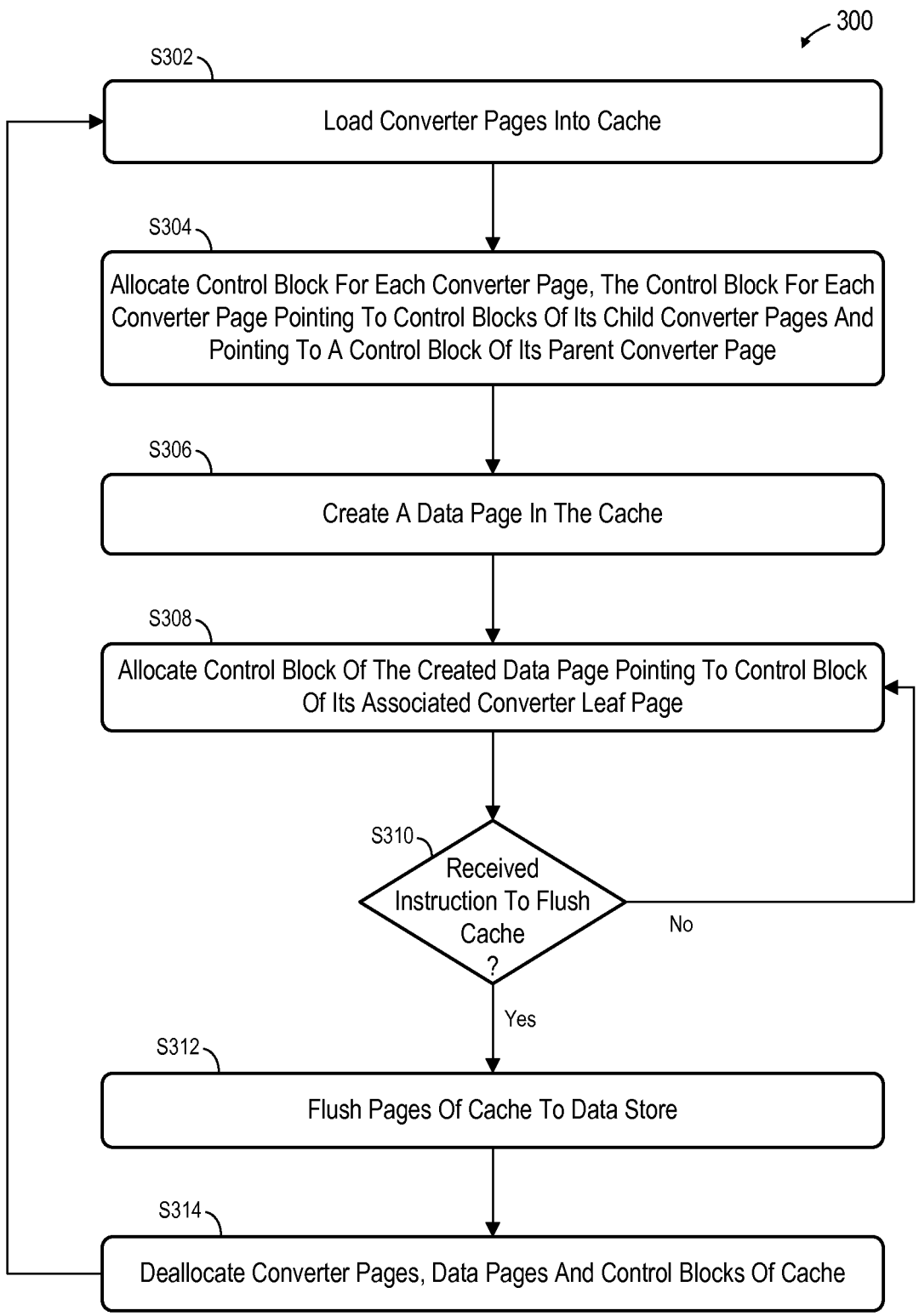
FIG. 3 comprises a flow diagram of a process according to some embodiments.

As mentioned above, converter 122 is loaded into cache 120 based on converter pages 1326 upon initialization of database 100. FIG. 3 is a flow diagram of process 300 to describe this loading and subsequent actions according to some embodiments. Process 300 may occur at initialization, restart, after a savepoint, or at any other suitable time in the lifecycle of a database system.

In some embodiments, various hardware elements of a database execute program code to perform process 300. Process 300 may be performed by data access manager 114 of database server process 110 according to some embodiments. Process 300 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S302, converter pages are loaded into a cache. The converter pages may comprise inner pages (including a converter root page) and leaf pages as described above. The loaded converter pages may be copies of converter pages stored within a persistent datastore.

In one example of 5302 according to some embodiments, a location of a root page of converter 1326 is identified from restart record 1328 of datastore 130. Based on the information in the root page, the locations of all other pages of converter 1326 are is determined and each page is read and recreated in cache 120 to create converter 122.

Figure 4:
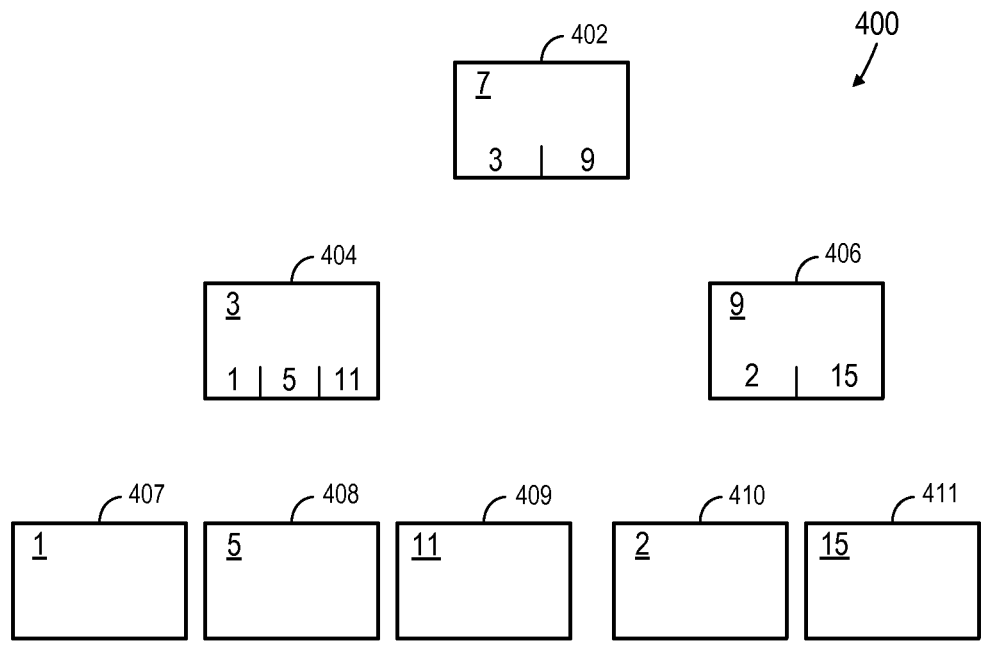
FIG. 4 illustrates converter pages in a cache according to some embodiments.

FIG. 4 illustrates converter 400 for the purpose of describing process 300 according to some embodiments. The pages of converter 400 are stored in a cache and are loaded therein based on converter pages stored in a datastore. Accordingly, the tree structure of converter 400 is identical to the tree structure of the corresponding converter of the datastore.

Converter 400 includes root converter page 402, inner pages 404 and 406, and converter leaf pages 407 through 411. As shown, each converter inner page 402 through 406 includes a reference to each of its child converter pages. A converter inner page may reference one or more child converter pages, and, depending on the level of the converter inner page, its child converter pages may comprise other converter inner pages or converter leaf pages. Embodiments are not limited to the number of tree levels or converter pages of converter 400.

A control block for each converter page is allocated in the cache at 5304. In this regard, when a page (i.e., converter page, data page, etc.) is created in the cache, a respective control block for the page is also allocated within the cache. The control block includes a pointer to its associated page in the cache. The control block may include a plurality of other members, including but not limited to members to specify a logical page number of the page, a read/write lock for the contents of the page, an I/O lock, an in-memory lock flag, a callback and callback context, a "modified" flag, Least Recently Used (LRU) information used to implement page replacement policies for freeing cache space, etc.

Figure 5:
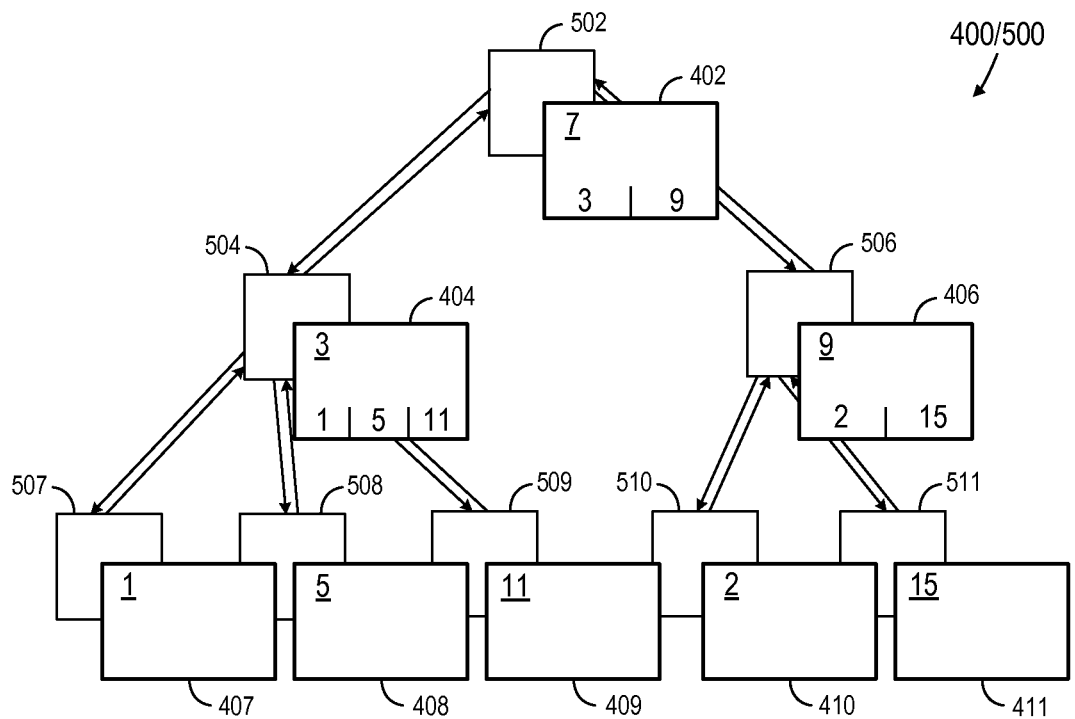
FIG. 5 illustrates converter pages and their respective control blocks in a cache according to some embodiments.

According to some embodiments, the control block allocated at 5304 for each converter page points to control blocks of its child converter pages (if any) and points to a control block of its parent converter page. FIG. 5 illustrates control blocks 502 through 511 respectively corresponding to each of converter pages 402 through 411. Arrows indicate the existence of pointers pointing from various control blocks to various control blocks.

As shown, inner pages 404 and 406 are associated with control blocks 504 and 506, respectively. Control block 504 includes pointers pointing to control blocks 507-509 associated with leaf pages 407-409, and control block 506 includes pointers pointing to control blocks 510-511 associated with leaf pages 410-411. Control block 504 and control block 504 each include a pointer pointing to control block 502 of root page 402.

Converter root page 402 has no parent page, so its control block 502 only includes pointers to the control blocks of child pages 404 and 406. Since no child pages descend from leaf pages 407-411, control blocks 507-511 of leaf pages 407-411 simply point to control blocks 504 or 506 of their respective parent converter pages 404 or 406.

A data page is been created in the cache at 5306. Examples of how such a data page might be created will be described below with respect to FIG. 7, but currently it will simply be assumed that a data page is created in the cache at 5306. In response to creation of the data page, a control block for the created data page is allocated in the cache at 5308. The control block points to the control block of a converter leaf page associated with the created data page. The associated converter leaf page is the leaf page which includes a mapping of the logical page number of the created data page to the block address of the "last known good" version of the data page in the persistent datastore.

Figure 6:
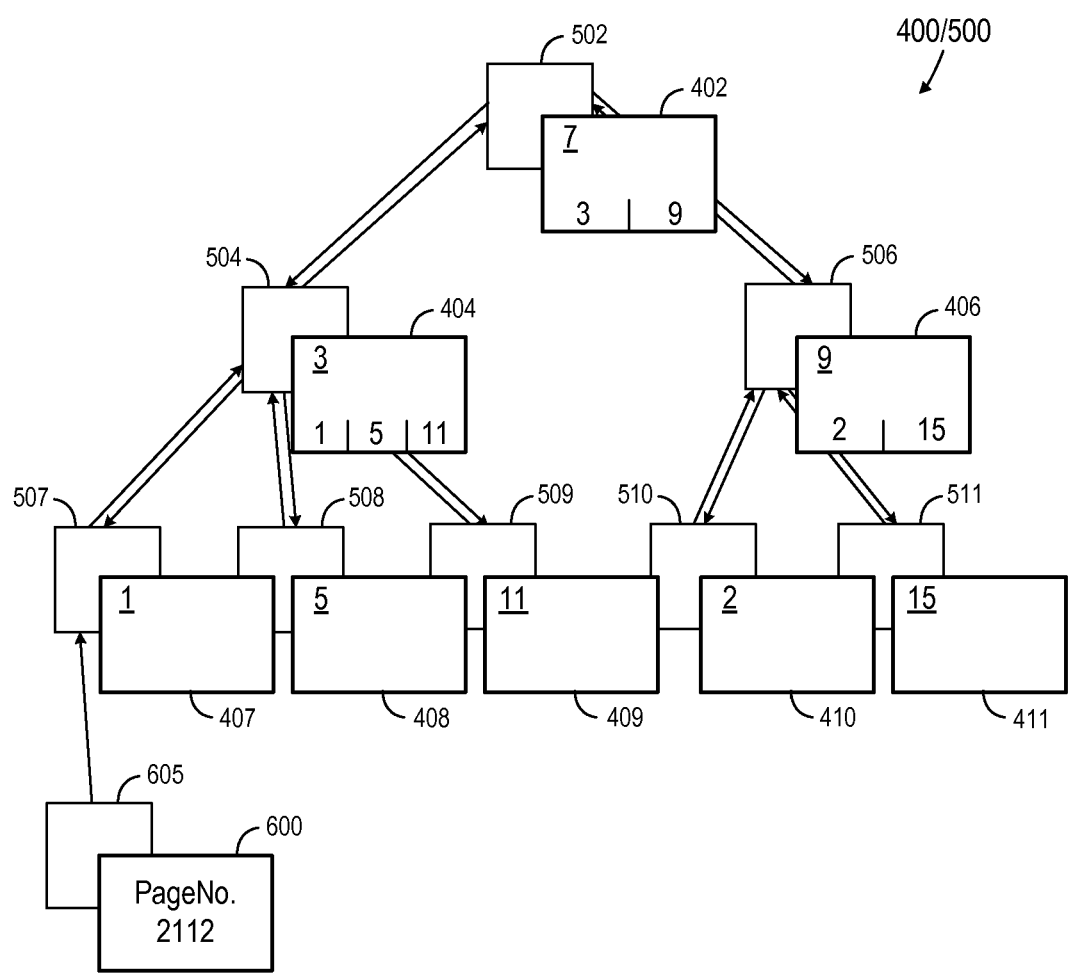
FIG. 6 illustrates converter pages, a data page, and their respective control blocks in a cache according to some embodiments.

FIG. 6 illustrates created data page 600, which resides in the cache and is associated with logical page number 2112. Converter leaf page 407 is associated with data page 600 because, for example, leaf page 407 includes mapping information for all pages having logical page numbers between 2,000 and 2,999. As described above, control block 605 of data page 600 points to control block 507 of leaf page 407.

Figure 7:
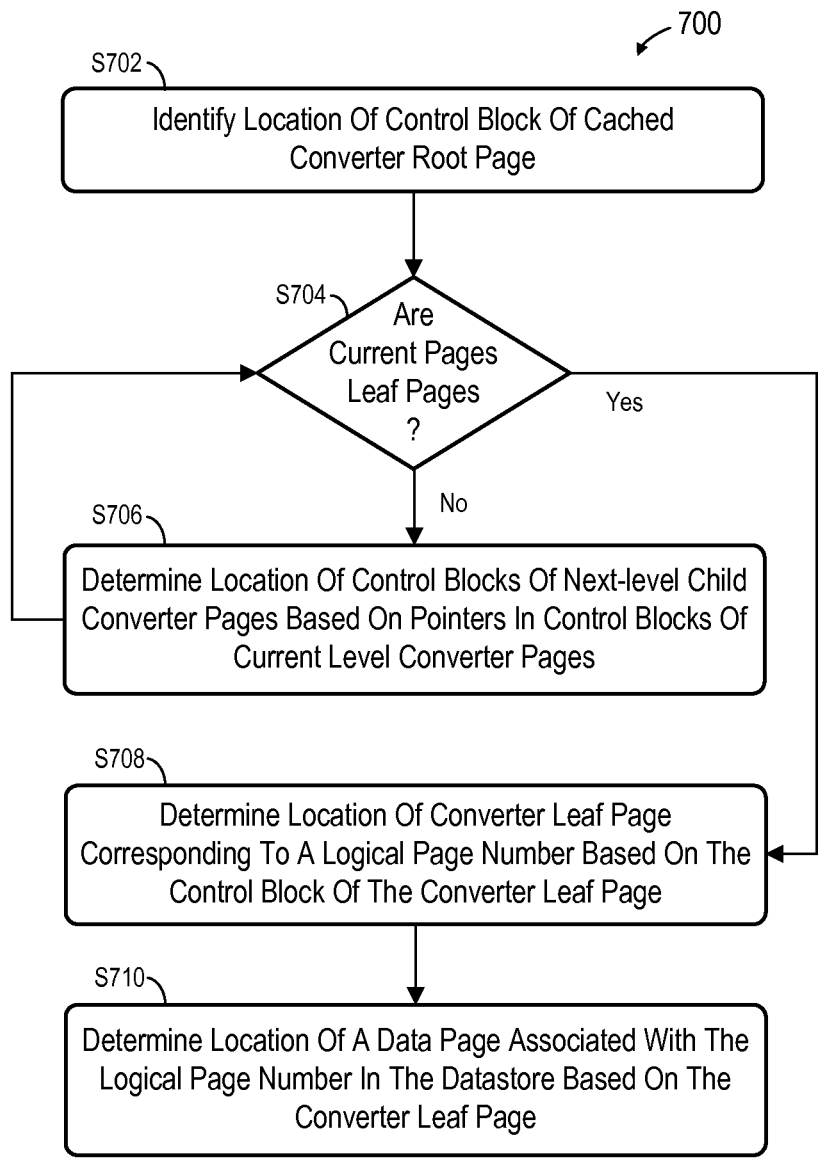
FIG. 7 comprises a flow diagram of a process to determine a location of a data page in a datastore according to some embodiments.

FIG. 7 illustrates process 700 for traversing a cached converter according to some embodiments. Process 700 will be described with respect to FIG. 6, but embodiments are not limited thereto.

Prior to process 700, an instruction may be received to create a data page in the cache. For example, a database transaction may require access to the data page. Accordingly, a location of the data page within the persistent datastore is first determined so that the data page may be retrieved from the location and copied to the cache.

In order to determine the location of the data page in the datastore, the location of the control block of the cached converter root page is identified at S702. According to some embodiments, the database system stores a converter object which includes a pointer to the control block of the cached converter root page. Next, at S704, it is is determined whether the current converter pages are converter leaf pages. If the root page is also a leaf page (i.e., if the converter includes only one page), flow continues to S708 as will be described below.

If the current pages are not converter leaf pages, locations of the control blocks of the next-level child converter pages are determined at S706. The locations of the control blocks are determined based on the above-described pointers of the control block of the current converter page (i.e., the converter root page). With respect to FIG. 6, the locations of control blocks 504 and 506 are initially determined at S706.

According to some embodiments, the location of the control block of only one child converter page is determined at S706. In such embodiments, leaf pages 407-411 are ordered such that the logical page number of interest determines the particular tree branch to be descended. Therefore, only the control block associated with the converter page that is located on the next level of the particular tree branch is determined at S706.

In contrast to prior systems described in the Background, traversal of converter 400 according to some embodiments does not require a hash map lookup to determine the location of a descendant converter page. Therefore, embodiments may provide more-efficient tree traversal regardless of whether one or more converter tree branches are descended.

Flow returns to S704 from S706 to again determine whether the current converter pages are converter leaf pages. Since pages 404 and 406 are not converter leaf pages, flow returns to S704 to determine locations of the control blocks of the next-level converter pages based on the pointers of control blocks 504 and 506.

Upon return to S704, it is determined that now-current converter pages 407-411 are leaf pages. Flow therefore continues to S708 to determine a location of a converter leaf page associated with the logical page number of interest based on the control block of the leaf page. It will be assumed that the logical page number of the data page of interest is 2112. Since leaf page 407 is associated with logical page number 2112, control block 507 is read at S708 to identify a pointer to the location of its corresponding leaf page 407.

Leaf page 407 is read from this location at S710 to determine the persisted location of the data page associated with the logical page number 2112. As described is above, this location may comprise a block address of a data volume. The data page may then be read from this location and stored among cached data pages 124 for fast access thereto.

Figure 8:
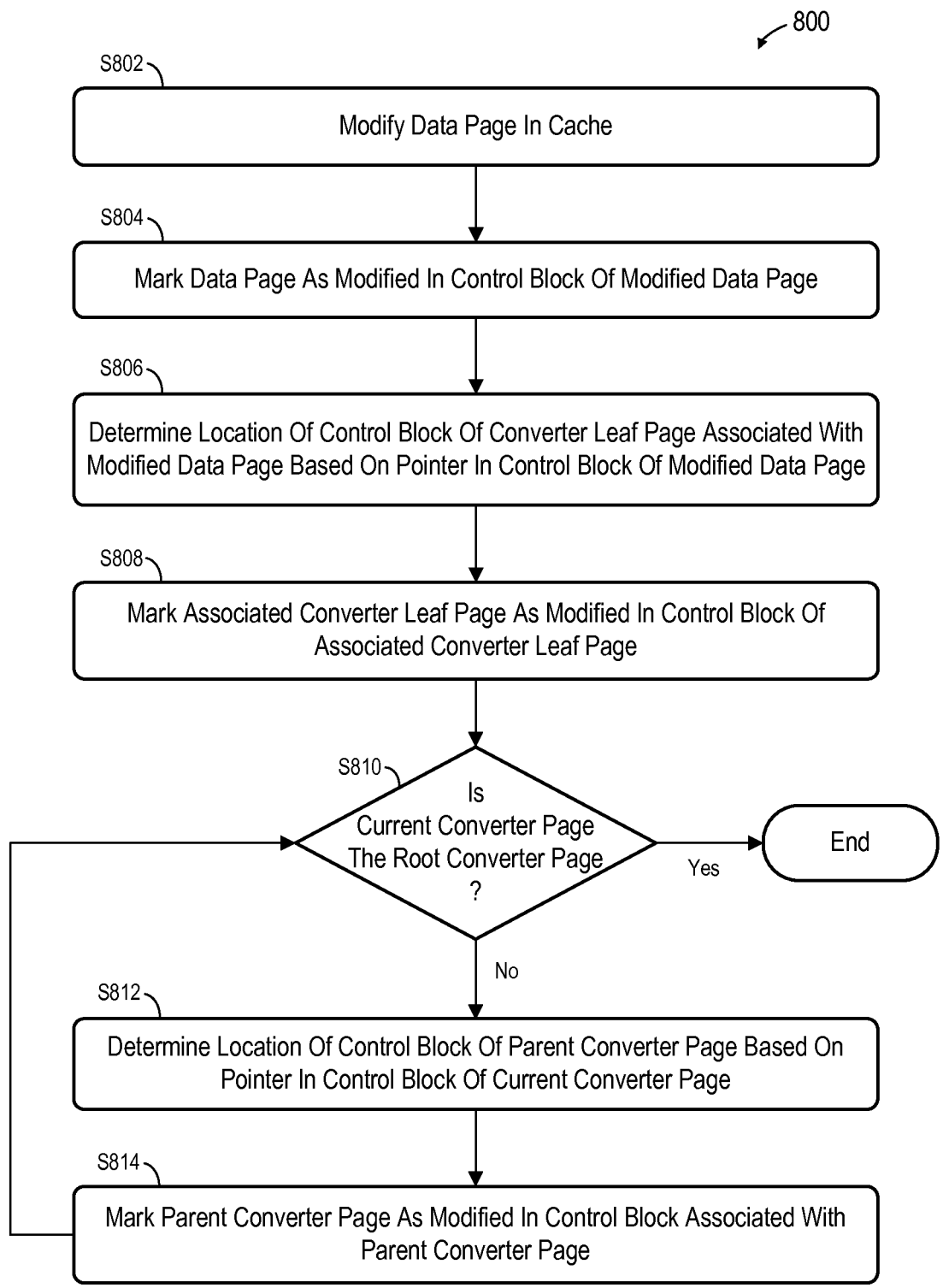
FIG. 8 comprises a flow diagram of a process to mark converter pages as modified according to some embodiments.

FIG. 8 is a flow diagram of process 800 to mark converter pages as modified in response to modification of a data page within a cache. Such marking may facilitate a shadow paging system as described above.

As described above, a data page may be read from a datastore and stored in a cache. Such a data page is modified within the cache at S802. The modified page remains in the cache and, at S804, the modified page is designated as modified using a control block of the data page. For example, a "modified" flag of the control block may be set at S804 to mark the associated data page as modified. As described above, the control block may have been previously allocated for the data page upon creation of the data page within the cache.

The modified data pages of the cache will eventually be written to the datastore, but will not be written to the block addresses from which they were initially read. Instead, the original unmodified pages remain designated as "last known good" pages at their block addresses and the modified pages will be written to new block addresses of the datastore. Since the cached converter maps logical page numbers to block addresses of the "last known good" versions of the data pages, the cached converter should be modified after the modified data pages are saved in order to reflect the persistent storage locations to which the modified data pages were saved.

Accordingly, the cached converter pages which correspond to each modified page must be identified. At S806, a location of a control block of a converter leaf page is determined. The converter leaf page is associated with the data page that was modified at S802. Moreover, the location of the control block of the converter leaf page is determined based on a pointer in the control block of the modified data page.

Figure 9:
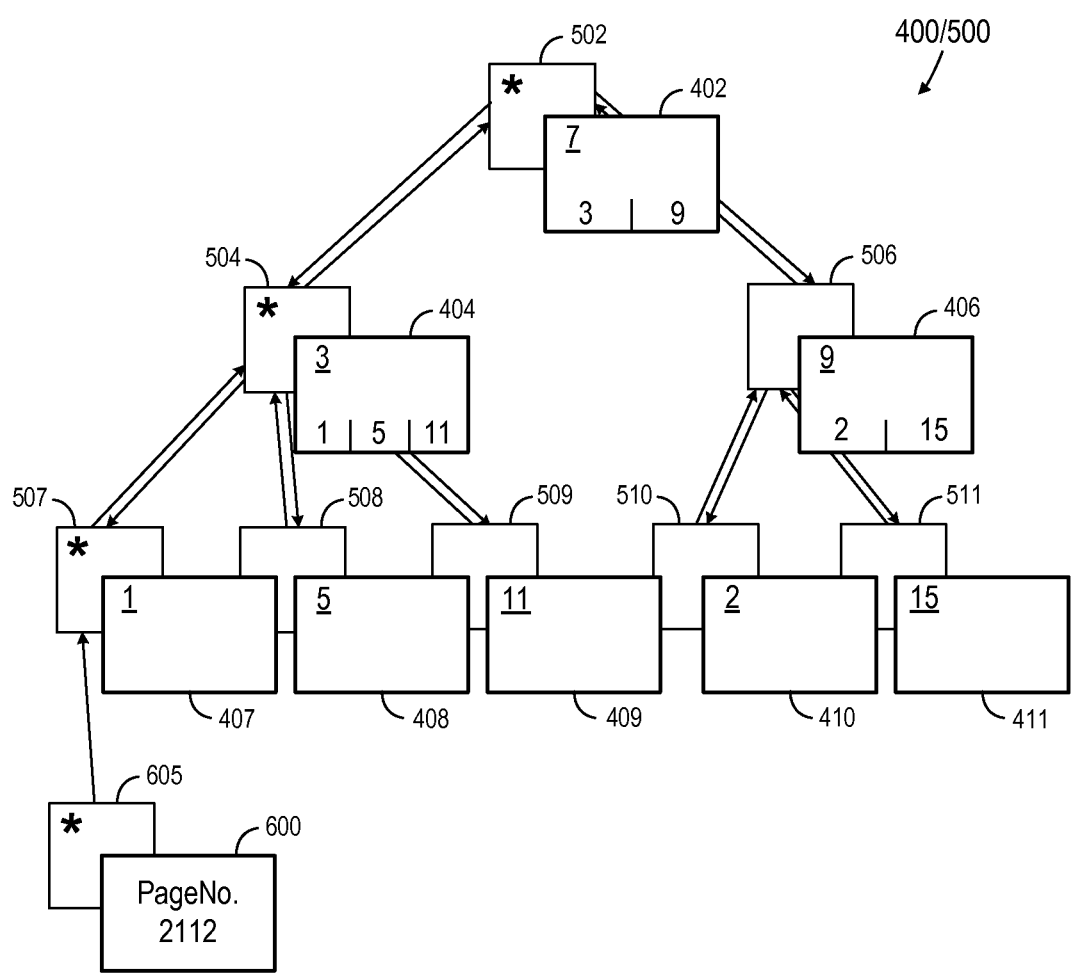
FIG. 9 illustrates converter pages, a data page, and their respective control blocks in a cache according to some embodiments.

FIG. 9 illustrates one implementation of process 800 according to some embodiments. It is assumed that cached data page 600, corresponding to logical page number 2112, is modified at S802. Data page is marked as modified at S804 by setting a modified flag (e.g., "*") of associated control block 605.

Control block 605 includes a pointer to control block 507 of converter leaf page 407. As mentioned above, converter leaf page 407 is associated with data page 600 because converter leaf page 407 includes information mapping each of logical page numbers 2,000-2,999 to respective block addresses of datastore 130. The pointer of control block 605 is used to determine the location of control block 507 at S806.

Next, at S808, the associated converter leaf page is marked as modified in the control block of the associated converter leaf page. With reference to FIG. 9, a modified flag of control block 507 is set at S808 in order to mark converter leaf page 407 as modified. At S810, it is determined whether the marked converter page is the converter root page (i.e., the converter includes only one page). If so, flow terminates. Flow proceeds to S810 if the marked converter page is not the converter root page.

Since converter pages which have been marked as modified will be saved to locations of the datastore different from their prior "last known good" versions, their ancestor converter pages must also be modified in order to reflect the new locations. Accordingly, at S812, a location of a control block of a parent converter page is determined based on a pointer in the control block of the current converter page which was marked as modified at S808. The parent converter page is then marked as modified at S814. FIG. 9 further shows the marking of parent converter page 404 as modified using its associated control block 504.

Flow then returns to S810 from S814. If it is again determined at S810 that the marked parent converter page is not the converter root page, a location of a control block of a next parent converter page is determined at S812 based on a pointer in the control block of the current converter page. The next parent converter page is then marked as modified at S814 as described above.

In the present example, converter page 404 is not the converter root page. Therefore, at S812, a location of control block 502 of parent converter page 402 is determined based on a pointer in control block 504 of current converter page 404, and converter page 402 is marked as modified using a modified flag of control block 502.

Flow cycles through S810, S812 and S814 to mark all direct ancestor pages as modified until the converter root page is marked as modified. Then, after saving modified page 600 to the datastore, each converter page which is marked as modified may be saved to the datastore. According to some embodiments, the saved converter leaf pages will have been modified to point to any new storage locations of their associated data pages and to their own new storage locations, and the saved converter inner pages will have been modified to point to the new storage location of at least one of their child pages, as well as to their own new storage locations. A new restart record may also be created to point to the new location of the root page of the converter.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A method for a database system, comprising:
 loading a plurality of converter pages of a datastore into a database cache, the plurality of converter pages comprising a plurality of converter inner pages, and a plurality of converter leaf pages;
 allocating a control block in the database cache for each of the plurality of converter inner pages, the control block of a converter inner page being in a different memory location than the converter inner page, and comprising a pointer to the converter inner page, a pointer to a control block of a parent converter inner page and a pointer to a control block of each child converter page of the converter inner page;
 allocating a control block in the database cache for each of the plurality of converter leaf pages, the control block of a converter leaf page being in a different memory location than the converter leaf page, and comprising a pointer to the converter leaf page and a pointer to a control block of a parent converter inner page;

creating a data page in the database cache, the data page associated with a logical page number; and allocating a control block in the database cache for the created data page, the control block being in a different memory location than the created data page, and comprising a pointer to a control block of a converter leaf page corresponding to the logical page number of the data page.

2. A method according to claim 1, wherein the plurality of converter pages comprise a converter root page, the method further comprising:

allocating a control block in the database cache for the converter root page, the control block of the converter root page comprising a pointer to each control block of each child converter page of the converter root page; and determining a location of a data page associated with a logical page number in the datastore by:
determining a location of the control block of the converter root page in the cache;
determining a location of a control block of each descendant converter inner page of the converter root page based on the pointer to each control block of each child converter page of the converter root page, and on the pointers to a control block of each child converter page of each converter inner page;
determining a location of each control block of each converter leaf page based on a pointer to each control block of each converter leaf page, the pointer to each control block of each converter leaf page located within the control blocks of each parent converter inner pages of each converter leaf page;
determining a location of a converter leaf page corresponding to the logical page number based on the control block of the converter leaf page corresponding to the logical page number; and
determining the location of the data page associated with the logical page number based on the converter leaf page corresponding to the logical page number.

3. A method according to claim 1, further comprising:
modifying the data page in the database cache;
marking the data page as modified in the control block of the data page;
determining a location of the control block of the converter leaf page corresponding to the logical page number of the data page, based on the pointer to the control block of the converter leaf page corresponding to the logical page number of the data page;
marking the converter leaf page corresponding to the logical page number of the data page as modified in the control block of the converter leaf page corresponding to the logical page number;
determining a location of the control block of a parent converter inner page of the converter leaf page corresponding to the logical page number of the data page, based on a pointer to the control block of the parent converter inner page within the control block of the converter leaf page corresponding to the logical page number of the data page; and
marking the parent converter inner page as modified in the control block of the parent converter inner page.

4. A method according to claim 3, further comprising:
determining a location of the control block of a grandparent converter inner page of the converter leaf page corresponding to the logical page number of the data page, based on a pointer to the control block of the grandparent converter inner page within the control block of the parent converter inner page; and
marking the grandparent converter inner page as modified in the control block of the grandparent converter inner page.

5. A non-transitory computer-readable medium storing program code, the program code executable by a computer, the program code comprising:

code to load a plurality of converter pages of a datastore into a database cache, the plurality of converter pages comprising a plurality of converter inner pages, and a plurality of converter leaf pages;

code to allocate a control block in the database cache for each of the plurality of converter inner pages, the control block of a converter inner page being in a different memory location than the converter inner page, and comprising a pointer to the converter inner page, a pointer to a control block of a parent converter inner page and a pointer to a control block of each child converter page of the converter inner page;

code to allocate a control block in the database cache for each of the plurality of converter leaf pages, the control block of a converter leaf page being in a different memory location than the converter leaf page, and comprising a pointer to the converter leaf page and a pointer to a control block of a parent converter inner page;

code to create a data page in the database cache, the data page associated with a logical page number; and code to allocate a control block in the database cache for the created data page, the control block being in a different memory location than the created data page, and comprising a pointer to a control block of a converter leaf page corresponding to the logical page number of the data page.

6. A medium according to claim 5, wherein the plurality of converter pages comprise a converter root page, and the program code further comprising:

code to allocate a control block in the database cache for the converter root page, the control block of the converter root page comprising a pointer to each control block of each child converter page of the converter root page; and code to determine a location of a data page associated with a logical page number in the datastore, comprising:
code to determine a location of the control block of the converter root page in the cache;
code to determine a location of a control block of each descendant converter inner page of the converter root page based on the pointer to each control block of each child converter page of the converter root page, and on the pointers to a control block of each child converter page of each converter inner page;
code to determine a location of each control block of each converter leaf page based on a pointer to each control block of each converter leaf page, the pointer to each control block of each converter leaf page located within the control blocks of each parent converter inner pages of each converter leaf page;
code to determine a location of a converter leaf page corresponding to the logical page number based on the control block of the converter leaf page corresponding to the logical page number; and
code to determine the location of the data page associated with the logical page number based on the converter leaf page corresponding to the logical page number.

7. A medium according to claim 5, the program code further comprising:
code to modify the data page in the database cache;

code to mark the data page as modified in the control block of the data page;

code to determine a location of the control block of the converter leaf page corresponding to the logical page number of the data page, based on the pointer to the control block of the converter leaf page corresponding to the logical page number of the data page;

code to mark the converter leaf page corresponding to the logical page number of the data page as modified in the control block of the converter leaf page corresponding to the logical page number;

code to determine a location of the control block of a parent converter inner page of the converter leaf page corresponding to the logical page number of the data page, based on a pointer to the control block of the parent converter inner page within the control block of the converter leaf page corresponding to the logical page number of the data page; and code to mark the parent converter inner page as modified in the control block of the parent converter inner page.

8. A medium according to claim 7, the program code further comprising:

code to determine a location of the control block of a grandparent converter inner page of the converter leaf page corresponding to the logical page number of the data page, based on a pointer to the control block of the grandparent converter inner page within the control block of the parent converter inner page; and code to mark the grandparent converter inner page as modified in the control block of the grandparent converter inner page.

9. A system comprising:

a datastore storing a plurality of converter pages and a plurality of data pages, the plurality of converter pages comprising a plurality of converter inner pages and a plurality of converter leaf pages;

a database cache;

a memory storing processor-executable process steps; and a processor to execute the processor-executable process steps to cause the system to:

load a plurality of converter pages of the datastore into the database cache;

allocate a control block in the database cache for each of the plurality of converter inner pages, the control block of a converter inner page being in a different memory location than the converter inner page, and comprising a pointer to the converter inner page, a pointer to a control block of a parent converter inner page and a pointer to a control block of each child converter page of the converter inner page;

allocate a control block in the database cache for each of the plurality of converter leaf pages, the control block of a converter leaf page being in a different memory location than the converter leaf page, and comprising a pointer to the converter leaf page and a pointer to a control block of a parent converter inner page;

create a data page in the database cache, the data page associated with a logical page number; and allocate a control block in the database cache for the created data page, the control block being in a different memory location than the created data page, and comprising a pointer to a control block of a converter leaf page corresponding to the logical page number of the data page.

10. A system according to claim 9, wherein the plurality of converter pages comprise a converter root page, and the processor to further execute the processor-executable process steps to cause the system to:

allocate a control block in the database cache for the converter root page, the control block of the converter root page comprising a pointer to each control block of each child converter page of the converter root page; and determine a location of a data page associated with a logical page number in the datastore by:

determining a location of the control block of the converter root page in the cache;

determining a location of a control block of each descendant converter inner page of the converter root page based on the pointer to each control block of each child converter page of the converter root page, and on the pointers to a control block of each child converter page of each converter inner page;

determining a location of each control block of each converter leaf page based on a pointer to each control block of each converter leaf page, the pointer to each control block of each converter leaf page located within the control blocks of each parent converter inner pages of each converter leaf page;

determining a location of a converter leaf page corresponding to the logical page number based on the control block of the converter leaf page corresponding to the logical page number; and determining the location of the data page associated with the logical page number based on the converter leaf page corresponding to the logical page number.

11. A system according to claim 9, the processor to execute the processor-executable process steps to cause the system to:

modify the data page in the database cache;

mark the data page as modified in the control block of the data page;

determine a location of the control block of the converter leaf page corresponding to the logical page number of the data page, based on the pointer to the control block of the converter leaf page corresponding to the logical page number of the data page;

mark the converter leaf page corresponding to the logical page number of the data page as modified in the control block of the converter leaf page corresponding to the logical page number;

determine a location of the control block of a parent converter inner page of the converter leaf page corresponding to the logical page number of the data page, based on a pointer to the control block of the parent converter inner page within the control block of the converter leaf page corresponding to the logical page number of the data page; and mark the parent converter inner page as modified in the control block of the parent converter inner page.

12. A system according to claim 11, the processor to execute the processor-executable process steps to cause the system to:

determine a location of the control block of a grandparent converter inner page of the converter leaf page corresponding to the logical page number of the data page, based on a pointer to the control block of the grandparent converter inner page within the control block of the parent converter inner page; and mark the grandparent converter inner page as modified in the control block of the grandparent converter inner page.

* * * * *